United States Patent
Hopper et al.

(10) Patent No.: US 7,049,042 B2
(45) Date of Patent: May 23, 2006

(54) TONER PROCESSES

(75) Inventors: Michael A. Hopper, Toronto (CA); Raj D. Patel, Oakville (CA); Enno E. Agur, Toronto (CA); Joseph Bartel, Dublin, CA (US); Daryl Vanbesien, Burlington (CA)

(73) Assignee: Xerox Corporation, Stamford, CT (US)

( * ) Notice: Subject to any disclaimer, the term of this patent is extended or adjusted under 35 U.S.C. 154(b) by 195 days.

(21) Appl. No.: 10/777,960

(22) Filed: Feb. 12, 2004

(65) Prior Publication Data

US 2005/0181294 A1    Aug. 18, 2005

(51) Int. Cl.
*G03G 9/08*    (2006.01)
*C08J 3/215*    (2006.01)

(52) U.S. Cl. .................. 430/137.14; 523/335
(58) Field of Classification Search ......... 430/105, 430/137.14; 523/335
See application file for complete search history.

(56) References Cited

U.S. PATENT DOCUMENTS

| 4,558,108 A | 12/1985 | Alexandru et al. ......... 526/340 |
| 4,797,339 A | 1/1989 | Maruyama et al. ......... 430/109 |
| 4,983,488 A | 1/1991 | Tan et al. .................... 430/137 |
| 4,996,127 A | 2/1991 | Hasegawa et al. .......... 430/109 |
| 5,290,654 A | 3/1994 | Sacripante et al. ......... 430/137 |
| 5,344,738 A | 9/1994 | Kmiecik-Lawrynowicz et al. ........................... 430/137 |
| 5,403,693 A | 4/1995 | Patel et al. ................. 430/137 |
| 5,840,462 A | 11/1998 | Foucher et al. ............. 430/137 |
| 5,869,215 A | 2/1999 | Ong et al. ................... 430/137 |
| 5,945,245 A | 8/1999 | Mychajlowskij et al. ... 430/137 |
| 5,994,020 A | 11/1999 | Patel et al. ................. 430/137 |
| 6,130,021 A | 10/2000 | Patel et al. ................. 430/137 |
| 6,294,302 B1 | 9/2001 | Serizawa et al. ........... 430/106 |
| 6,500,597 B1 | 12/2002 | Patel et al. ............ 430/137.14 |
| 6,576,389 B1 * | 6/2003 | Vanbesien et al. ..... 430/137.14 |
| 2003/0180650 A1 * | 9/2003 | Patel et al. ............ 430/137.14 |

OTHER PUBLICATIONS

Vanbesien, Daryl et al., U.S. Appl. No. 10/603,449, filed Jun. 25, 2003 on Toner Processes.

* cited by examiner

*Primary Examiner*—John L Goodrow
(74) *Attorney, Agent, or Firm*—E. O. Palazzo

(57) ABSTRACT

A process for the preparation of toner by, for example, mixing a colorant, a latex, and a coagulant comprising cationic wax dispersion to provide, for example, a toner composition of high gloss images.

25 Claims, No Drawings

TONER PROCESSES

CROSS-REFERENCE TO RELATED APPLICATIONS

Illustrated in copending application Ser. No. 10/606,298, U.S. Publication 20050255402, filed Jun. 25, 2003 on "Toner Process", the disclosure of which is totally incorporated herein by reference, is a toner process comprised of a first heating of a mixture of an aqueous colorant dispersion, an aqueous latex emulsion, and an aqueous wax dispersion in the presence of a coagulant to provide aggregates, adding a base followed by adding an organic sequestering agent, and thereafter accomplishing a second heating, and wherein said first heating is below about the latex polymer glass transition temperature (Tg), and said second heating is above about the latex polymer glass transition temperature.

Illustrated in copending application Ser. No. 10/603,449, U.S. Publication 20040265727, filed Jun. 25, 2003 on "Toner Processes", the disclosure of which is totally incorporated herein by reference, is a toner process comprised of a first heating of a colorant dispersion, a latex emulsion, and a wax dispersion in the presence of a coagulant containing a metal ion; adding a silicate salt; followed by a second heating.

In U.S. Pat. No. 5,403,693, the disclosure of which is totally incorporated herein by reference, there is illustrated a process for the preparation of toner comprising mixing a colorant, a latex, in the presence of a coagulant, followed by aggregation and coalescence and wherein the coagulant is a cationic surfactant.

Also, illustrated in U.S. Pat. No. 5,994,020 and U.S. Pat. No. 6,130,021, the disclosures of which are totally incorporated herein by reference, are toner preparation processes, and more specifically, a process for the preparation of toner comprising (i) preparing, or providing a colorant dispersion;

(ii) preparing, or providing a functionalized wax dispersion comprised of a functionalized wax contained in a dispersant mixture comprised of a nonionic surfactant, an ionic surfactant, or mixtures thereof;

(iii) shearing the resulting mixture of the functionalized wax dispersion (ii) and the colorant dispersion (i) with a latex or emulsion blend comprised of resin contained in a mixture of an anionic surfactant and a nonionic surfactant in the presence of a coagulant;

(iv) heating the resulting sheared blend of (iii) below about the glass transition temperature (Tg) of the resin particles;

(v) optionally adding additional anionic surfactant to the resulting aggregated suspension of (iv) to prevent, or minimize additional particle growth of the resulting electrostatically bound toner size aggregates during coalescence (iv);

(vi) heating the resulting mixture of (v) above about the Tg of the resin; and optionally, (vii) separating the toner particles; and a process for the preparation of toner comprising blending a latex emulsion containing resin, colorant, and a polymeric additive; adding an acid to achieve a pH of about 2 to about 4 for the resulting mixture; heating at a temperature about equal to, or about below the glass transition temperature (Tg) of the latex resin to initiate aggregation; optionally adding an ionic surfactant stabilizer; heating at a temperature about equal to, or about above about the Tg of the latex resin; and optionally cooling, isolating, washing, and drying the toner.

The appropriate components and processes of the above recited copending applications and patents may be selected for the processes of the present invention in embodiments thereof.

BACKGROUND

The present invention is generally directed to toner processes, and more specifically, to chemical processes which involve the aggregation and fusion of latex resin, wax particles, colorant like pigment or dye, and additive particles into toner in the presence of a coagulant, wherein the coagulant is a cationically stabilized wax dispersion, followed by heating below about the resin Tg to provide toner size aggregates, followed by the addition of a base, and thereafter heating the aggregates above the resin Tg to provide coalesced toner particles. More specifically, the present invention is directed to the preparation of toner particles wherein there is selected as a coagulant a cationic wax dispersion, and wherein there is optionally added to the wax dispersion an additional cationic surfactant, which surfactant is the same as that used for the wax dispersion, such as an alkyl benzyl ammonium halide like a chloride, or can be a different cationic surfactant.

Toners prepared by the process of the present invention possess a number of advantages as compared to a number of the toners generated by known emulsion aggregation processes, which advantages include, for example, the ability to produce a fused glossy image without a polyaluminum halide as a coagulant, the synthesis of a wax containing toner wherein the wax is fully incorporated into the toner without the use of polyaluminum halide as a coagulant, and wherein the resulting toner can contain an about 20 to about 50 percent of a crosslinked resin.

The toners generated with the processes of the present invention are especially useful for imaging processes, especially xerographic processes, which usually require toner transfer efficiency in excess of greater than about 90 percent, such as those with a compact machine design without a cleaner or those that are designed to provide high quality colored images with excellent image resolution, acceptable signal-to-noise ratio, and image uniformity.

REFERENCES

In xerographic systems, especially color systems, small sized toners of preferably from about 2 to about 10 microns volume average diameter are of value to the achievement of high image quality for process color applications. Also of value is to achieve a low image pile height to eliminate, or minimize image feel and avoid paper curling after fusing. Paper curling can be present in xerographic color processes primarily because of the presence of relatively high toner coverage as a result of the application of three to four color toners. During fusing, moisture escapes from the paper due to high fusing temperatures of from about 120° C. to about 200° C. In the situation wherein only one layer of toner is selected, such as in one-color black or highlight color xerographic applications, the amount of moisture driven off during fusing can be reabsorbed by the paper and the resulting print remains relatively flat with minimal paper curl. In process color where toner coverage is high, the relatively thick toner plastic covering on the paper can inhibit the paper from reabsorbing the moisture, and cause substantial paper curling. These and other imaging problems are avoided or minimized with the toners and processes of the present invention.

Further, it is desired in some instances to select certain toner particle sizes, such as from about 2 to about 15 microns, and with a high colorant, especially pigment loading, such as from about 4 to about 15 percent by weight of toner, thus the mass of toner for attaining a certain optical density and color gamut can be reduced to eliminate or minimize paper curl. Lower toner mass also helps ensure the achievement of image uniformity. However, higher pigment loadings often adversely affect the charging behavior of toners. For example, the toner charge levels may be too low for proper toner development or the charge distributions may be too wide and toners of wrong charge polarity may be present. Furthermore, higher pigment loadings may also result in the sensitivity of charging behavior to charges in environmental conditions such as temperature and humidity. Toners prepared in accordance with the processes of the present invention minimize, or avoid these disadvantages.

In U.S. Pat. No. 6,500,597, the disclosure of which is totally incorporated herein by reference, there is illustrated a process for the preparation of toner comprising mixing a colorant, an anionically stabilized latex particles, a anionically stabilized wax particles, and two coagulants, followed by aggregation and coalescence, and wherein one of the coagulants is a polyaluminum sulfosilicate and optionally, polyaluminum chloride and the other is a cationic surfactant SANIZOL™ B. In U.S. Pat. No. 6,294,302, the disclosure of which is totally incorporated herein by reference, there is illustrated a process for the preparation of toner comprising mixing a colorant, an anionically stabilized latex, an anionically stabilized wax and polyaluminum chloride (PAC) coagulant, followed by aggregation and coalescence, wherein there was full wax retention within the toner particles.

There is illustrated in U.S. Pat. No. 4,996,127, the disclosure of which is totally incorporated herein by reference, a toner of associated particles of secondary particles comprising primary particles of a polymer having acidic or basic polar groups and a coloring agent. In U.S. Pat. No. 4,983,488, the disclosure of which is totally incorporated herein by reference, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 microns, are obtained. This process results, it is believed, in the formation of particles with a wide particle size distribution. Similarly, the aforementioned disadvantages, for example poor particle size distributions, are obtained hence classification is required resulting in low toner yields, are illustrated in other prior art, such as U.S. Pat. No. 4,797,339, the disclosure of which is totally incorporated herein by reference, wherein there is disclosed a process for the preparation of toners by resin emulsion polymerization, wherein similar to the '127 patent certain polar resins are selected; and U.S. Pat. No. 4,558,108, the disclosure of which is totally incorporated herein by reference, wherein there is disclosed a process for the preparation of a copolymer of styrene and butadiene by specific suspension polymerization. Other prior art includes U.S. Pat. Nos. 3,674,736; 4,137,188 and 5,066,560, the disclosures of which are totally incorporated herein by reference.

Emulsion/aggregation/coalescence processes for the preparation of toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256, 5,501,935, 5,723,253, 5,744,520, 5,763,133, 5,766,818, 5,747,215, 5,827,633, 5,853,944, 5,804,349, 5,840,462, and 5,869,215. The appropriate components and processes of the above Xerox Corporation patents can be selected for the processes of the present invention in embodiments thereof.

SUMMARY

It is a feature of the present invention to provide toner processes with many of the advantages illustrated herein.

In another feature of the present invention there are provided simple and economical processes for the preparation of high gloss black and colored toner compositions with excellent colorant dispersion thus enabling the achievement of high color print quality.

A feature of the present invention resides in the preparation of black or colored toners containing a wax dispersion which carries an electrostatic charge that is opposite to the charge of the base resin, for example a toner formulation containing negatively charged latex resin and positively charged wax dispersion particles to insure that the latex binds strongly to the wax surface or vice versa when the two are blended together in a ratio such that the opposite charges are compensated for.

Another feature of the present invention resides in the preparation of black or colored toners wherein a positively charged wax dispersion possesses a dual function of, for example, a release aid during fusing in a oil-less fusing system, and as the coagulant/co-coagulant agent for the toner system, for example in combination with a positively charged surfactant, and the preparation of black or colored toners, wherein the cationic wax dispersion is fully incorporated into the toner.

Also, features disclosed herein include the preparation of black or colored toners, which when fused result in a glossy finish, and which toners contain for example co-coagulants of positively charged wax dispersion particles at a concentration of from about 1 to about 15 percent by weight of toner and a cationic surfactant at concentration of from about 2 to about 0.2 percent by weight of toner, and wherein the glossy finish is, for example, from about 35 to about 80 GGU; a process for the preparation of toner with a volume average diameter of from about 1 to about 25 microns, and preferably from about 2 to about 12 microns, and a particle size distribution of from about 1.10 to about 1.28, and preferably from about 1.15 to about 1.25, each as measured by a Coulter Counter without the need to resort to conventional classifications to narrow the toner particle size distribution; and toner processes by aggregation and coalescence, or fusion (aggregation/coalescence) of latex resin, colorant, and additive particles, and wherein there can be selected a latex prepared by batch emulsion polymerization process or by a semicontinuous polymerization.

Aspects illustrated herein relate to a process comprising mixing a colorant, a latex emulsion, a coagulant comprised of a cationic wax dispersion and a cationic surfactant; a process for the preparation of toner comprising the mixing of a colorant dispersion, a latex emulsion, a cationic wax dispersion, and optionally a cationic surfactant, and wherein the mixture is aggregated by heating below the latex resin glass transition temperature, and thereafter fusing the resulting aggregates by heating above the latex resin glass transition temperature, and optionally wherein the aggregate mixture is at a pH of from about 5 to about 8, and wherein the latex is comprised of resin, nonionic surfactant, ionic surfactant, and water; a process comprising heating a colorant, a latex emulsion, a coagulant comprised of a cationic wax dispersion, and a cationic surfactant; a toner process wherein there is selected a latex comprised, for example, of submicron resin particles of, for example, about 0.15 to about 0.3 micron in volume average diameter, suspended in an aqueous phase comprised of a mixture of water, an anionic surfactant and a colorant dispersion comprising submicron pigment particles of, for example, about 0.08 to about 0.3 micron in volume average diameter as measured by a disc centrifuge, and suspended in an aqueous phase of water and an anionic surfactant, and optionally a nonionic surfactant or mixtures thereof, which are then blended together in the presence of a cationic wax dispersion, and wherein the resultant blend is stirred and heated to a temperature below the resin Tg, resulting in aggregates to which is optionally added a second latex to provide a coating on the formed toner aggregates, followed by adjusting the pH of the mixture with a base, and heating the mixture to a temperature above the resin Tg, followed by adjusting the pH of the mixture with an acid to fuse or coalesce all or substantially all the aggregates; a process for the preparation of toner comprising mixing a colorant, an anionically stabilized latex, a cationic wax dispersion and a cationic surfactant coagulant, followed by aggregation and coalescence resulting in toner sized particles with complete wax, about 100 percent in embodiments, retention, and wherein the fused image with the toner particles has a high gloss, for example, greater than about 50 GGU; processes for the aggregation and coalescence or fusion of latex, colorant like pigment, dye, and additives in the presence of a coagulant system, such as a cationic wax dispersion comprised of submicron wax particles dispersed in an aqueous phase containing a cationic surfactant (a cationic wax dispersion), and optionally additional cationic surfactant of, for example, alkyl benzyl ammonium chloride (SANIZOL® B), wherein the cationic wax dispersion concentration is about 1 to about 15 percent by weight of toner and the cationic surfactant concentration is about 2 to about 0.2 percent by weight of toner, and which provides a toner which exhibits a high gloss of, for example, about 69.5 GGU compared to a toner prepared using a polyaluminum halide as the coagulant wherein the resulting toner has a gloss of about 35 GGU, and wherein the cationic wax dispersion is, for example, of a diameter of about 0.010 to about 0.400 micron, and wherein there are generated toner compositions with, for example, a volume average diameter of from about 1 micron to about 25 microns, and more specifically, from about 2 microns to about 10 microns, and with a narrow particle size distribution of, for example, from about 1.10 to about 1.33, and more specifically, a size distribution in the range of about 1.11 to about 1.26, the size and size distribution being measured by a Coulter Counter, without the need to resort to conventional pulverization and classification methods. The toners generated can be selected for known electrophotographic imaging and printing processes, including digital color processes such as in the Xerox Corporation DocuColor 1632 or the Xerox Corporation DocuColor 2240, and when fused results in glossy images, wherein the gloss is in the range of about 40 to about 90 ggu; a process comprising mixing a colorant dispersion, a latex emulsion, and a coagulant comprising at least a cationic wax dispersion, and optionally a cationic surfactant; a process wherein the colorant is a colorant dispersion comprised of (i) a colorant, water, and an ionic surfactant, or a nonionic surfactant;

(ii) wherein the colorant dispersion is blended with a latex emulsion comprised of an ionic surfactant, water and resin;

(iii) adding to the resulting blend a coagulant comprised of a cationic wax coagulant dispersion containing submicron wax particles of from about 0.1 to about 0.5 micron in diameter by volume, wherein the wax is dispersed in a cationic surfactant of the opposite charge polarity of the latex ionic surfactant, and optionally adding a cationic surfactant to initiate flocculation or aggregation of the resin latex, the colorant and the wax particles;

(iv) heating the resulting mixture below about, or about equal to the glass transition temperature (Tg) of the latex resin to form toner sized aggregates;

(v) adding to the formed toner aggregates a second latex comprised of resin suspended in an aqueous phase containing an ionic surfactant and water;

(vi) adding to the resulting mixture a base to thereby change the pH, which is from about 2 to about 2.9, to arrive at a pH of from about 5 to about 9 for the resulting toner aggregate mixture;

(vii) heating the resulting aggregate suspension of (vi) above about, or equal to about the Tg of the latex resin of (i);

(viii) retaining the mixture temperature of from about 70° C. to about 95° C. optionally for a period of about 10 to about 60 minutes, followed by a pH reduction with an acid to arrive at a pH of about 3.5 to about 5 to assist in permitting the fusion or coalescence of the toner aggregates;

(ix) optionally washing the resulting toner slurry; and (x) isolating the toner; and wherein the wax is fully incorporated into the toner; a process wherein the latex resin particles are from about 0.15 to about 0.3 micron in volume average diameter, the colorant is a pigment, a dye or mixtures thereof, and which colorant optionally is submicron in size of about 0.08 to about 0.34 micron in average volume diameter; a process wherein the base is selected from the group consisting of sodium hydroxide, potassium hydroxide, and ammonium hydroxide, and there is added to the formed toner aggregates a second latex comprised of submicron resin particles suspended in an aqueous phase containing an anionic surfactant, and wherein the second latex is selected in an amount of from about 10 to about 40 percent by weight of the initial latex to form a shell thereover, and which shell is of a thickness of about 0.2 to about 0.8 micron; the added latex contains the same resin as the initial latex of (i), or wherein the added latex contains a dissimilar resin than that of the initial latex, the pH of the mixture resulting in (vi) is increased from about 2 to about 2.6 to about 5 to about 8, and wherein the base functions primarily as a stabilizer for the aggregates during coalescence (vii), and no or minimal toner particle size or GSD increases result; and the temperature at which toner sized aggregates are formed controls the size of the aggregates, and wherein the final toner size is from about 2 to about 15 microns in volume average diameter; a toner process wherein the aggregation (iv) temperature is from about 45° C. to about 60° C., and wherein the coalescence or fusion temperature of (vii) is from about 85° C. to about 95° C., the colorant is a pigment, and wherein the pigment is in the form of dispersion, and which dispersion contains an ionic surfactant and optionally a nonionic surfactant, and wherein the cationic wax and the cationic surfactant function as coagulants and assist in the enablement of aggregation of the latex and the colorant; a process wherein the latex contains a resin or polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid); a toner process wherein the colorant is carbon black, cyan, yellow, magenta, orange, green, violet or mixtures thereof; the toner isolated is from about 2 to about 25 microns in volume average diameter, and the particle size distribution thereof is from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner; a toner process comprising the mixing of a colorant dispersion, a latex emulsion, a cationic wax dispersion, and optionally a cationic surfactant, and wherein the mixture is aggregated to toner size particles by heating below the latex resin glass transition temperature, and thereafter fusing the resulting aggregates by heating above the latex resin glass transition temperature wherein the aggregate mixture is at a pH of from about 5 to about 8, and wherein the latex is comprised of resin, nonionic surfactant, ionic surfactant, and water; a process for preparing toner compositions with a coagulant, such as a cationic wax and optionally a cationic surfactant (SANIZOL® B), wherein the cationic wax concentration is from about 1 to about 15 percent by weight of toner and the cationic surfactant SANIZOL® B concentration is from about 2 to about 0.2 percent by weight of toner; a process wherein the pigment is a colorant dispersion comprised of (i) a pigment, water, an ionic surfactant, and wherein the latex selected is an emulsion comprised of an anionic surfactant, water and resin;

(ii) wherein the pigment dispersion is blended with the latex emulsion comprised of submicron resin particles of from about 0.15 to about 0.3 micron in diameter by volume suspended in water, and an ionic surfactant;

(iii) adding to the resulting blend a dual coagulant comprised of a cationic wax coagulant dispersion comprised of submicron wax particles of from about 0.1 to about 0.5 micron in diameter by volume, which wax is dispersed in a cationic surfactant, which surfactant is of an opposite charge polarity of the latex ionic surfactant and a cationic surfactant to initiate flocculation or aggregation of the resin latex and the pigment;

(iv) heating the resulting mixture below about the glass transition temperature (Tg) of the latex resin to form toner sized aggregates;

(v) optionally adding a second latex comprised of resin particles suspended in an aqueous phase containing an anionic surfactant;

(vi) adding to the resulting mixture a base to thereby arrive at a pH of from about 5 to about 8 for the resulting toner aggregate mixture;

(vii) heating the resulting aggregate suspension of (vi) above about to the Tg of the latex resin;

(viii) optionally retaining the mixture (vii) at a temperature in the range of from about 70° C. to about 97° C. for a period of, for example, about 10 to about 75 minutes, followed by a pH reduction with an acid to arrive at a pH in the range of about 3.5 to about 5 to assist in permitting the fusion or coalescence of the toner aggregates;

(ix) separating and washing the resulting toner slurry; and isolating the toner by, for example, filtration, centrifuge, press filters, and the like; a process wherein the base is selected from the group consisting of sodium hydroxide, potassium hydroxide, and ammonium hydroxide, and wherein the acid is selected from the group consisting of nitric acid, sulfuric acid, hydrochloric acid, citric acid and acetic acid; a process wherein there is added to the formed toner aggregates a second latex comprised of submicron resin particles suspended in an aqueous phase containing an ionic surfactant, and wherein the second latex is selected in an amount of about 10 to about 40 percent by weight of the initial latex (i); a process wherein the aggregation (iv) is accomplished by heating at a temperature below about the glass transition temperature of the polymer contained in the latex; a process wherein the coalescence (vii) is accomplished by heating at a temperature of above about the glass transition temperature of the polymer contained in the latex; a process wherein the aggregation temperature is from about 40° C. to about 60° C.; a process wherein the coalescence temperature is from about 75° C. to about 96° C.; a process wherein the temperature at which the aggregation is accomplished controls the size of the aggregates, and wherein the final toner size is from about 2 to about 10 microns in volume average diameter; a process wherein the aggregation (iv) temperature is from about 45° C. to about 58° C., and wherein the coalescence or fusion temperature of (vii) and (viii) is from about 85° C. to about 95° C.; a process wherein the colorant is a pigment, and wherein the pigment is in the form of dispersion, and which dispersion contains an ionic surfactant, and wherein the cationic wax dispersion and the cationic surfactant SANIZOL® B function as coagulants and enable aggregation of the latex and the colorant and wax particles; a process wherein the colorant is carbon black, cyan, yellow, magenta, or mixtures thereof; a process wherein the toner isolated is from about 2 to about 15 microns in volume average diameter, and the particle size distribution (GSD) thereof is from about 1.15 to about 1.30, and wherein there is added to the surface of the formed toner additives, such as metal salts, metal salts of fatty acids, silicas, or metal oxides, each in an amount of from about 0.1 to about 5 weight percent of the obtained toner; a process which comprises mixing a latex, surfactant and colorant, heating in the presence of a cationic wax dispersion and an optional cationic surfactant (SANIZOL® B), the resulting mixture below the glass transition temperature of the latex resin, followed by the addition of a base to stabilize the toner aggregates, thereafter heating the resulting aggregates above the glass transition temperature of the latex resin followed by a reduction in pH with an acid, followed by an additional heating, and then isolating, washing and drying the toner; a process wherein prior to isolating the toner heating is retained at a temperature of from about 70° C. to about 95° C. for a period of about 1 to about 6 hours and preferably about 1.5 to about 4 hours at a pH in the range of about 3.5 to about 5 until fusion or coalescence of the aggregates is accomplished; a process for the preparation of toner comprising the mixing of a colorant dispersion, an anionic latex emulsion, a cationic wax and a cationic surfactant, and wherein the resulting mixture is aggregated by heating below the latex resin glass transition temperature, and then fusing the resulting aggregate by heating above the latex resin glass transition temperature wherein the aggregate mixture is initially at a pH of from about 2.4 to about 7 followed by a reduction of the pH to about 3 to about 5, and wherein the latex is comprised of resin, an ionic surfactant, and water; a process wherein the cationic wax and the cationic surfactant functions as a coagulant and enables or assists in enablement of the aggregation; a process wherein the colorant is a colorant dispersion comprised of (i) submicron pigment particles of 0.08 to 0.3 micron dispersed in water and an ionic surfactant, the latex is a latex emulsion comprised of submicron resin particles of 0.15 to 0.3 micron suspended in water and an ionic surfactant; and (ii) wherein the colorant dispersion is blended with the latex emulsion;

(iii) adding to the resulting blend a coagulant comprised of a cationic wax dispersion comprised of submicron wax particles of from about 0.1 to about 0.4 micron in diameter by volume, which wax is dispersed in a cationic surfactant of the opposite charge polarity of the latex ionic surfactant and optionally an additional cationic surfactant which can be the same as that used to disperse the wax particles or a different cationic surfactant to initiate flocculation or aggregation of the resin latex, the colorant and wax particles;

(iv) heating the resulting mixture below or about equal to the glass transition temperature (Tg) of the latex resin to form toner sized aggregates;

(v) adding a second latex comprised of submicron resin particles suspended in an aqueous phase containing an ionic surfactant to the formed toner aggregates resulting in a shell formation, the shell is, for example, of from about 0.1 to about 5 microns in thickness;

(vi) adjusting with a base the pH of the resulting toner aggregate mixture to about 5 to about 8 to primarily stabilize the aggregate particles;

(vii) heating and fusing the resulting aggregate suspension of (vi) above the Tg of the latex resin;

(viii) retaining the mixture (vii) temperature in the range of from about 70° C. to about 95° C. to initiate the fusion or coalescence of the toner aggregates, (ix) changing the pH of the above (viii) mixture with an acid to arrive at a pH in the range of about 2.8 to about 6, and more specifically, in the range of about 3.5 to about 5 to accelerate the fusion or the coalescence resulting in toner particle comprised of resin, colorant, and wax wherein the particle size is about 2 to about 25 microns;

(x) washing with water the resulting toner slurry; and (xi) isolating the toner, followed by drying the toner; a process wherein there is added to the formed toner aggregates a second latex in an amount of about 20 to about 35 percent by weight of the initial latex, and more specifically, in an amount of about 15 to about 30 weight percent to form a shell or coating on the aggregates where the thickness of the shell or coating is from about 0.2 to about 0.8 micron; a process wherein the aggregation temperature is from about 40° C. to about 62° C., or is from about 45° C. to about 58° C.; a process wherein the coalescence temperature is from about 75° C. to about 95° C., or from about 85° C. to about 90° C.; a process wherein there is added to the aggregate mixture prior to coalescence a base component; a process wherein the base is an alkali metal hydroxide; a process wherein the hydroxide is sodium hydroxide; a process wherein the pH of the mixture resulting after aggregation is increased from about 2 to about 2.6 to about 7 to about 8, during the coalescence, and wherein the base functions primarily as a stabilizer for the aggregates during the coalescence; a process wherein the amount of base selected is from about 8 to about 20 weight percent, or is from about 10 to about 20 weight percent; a process wherein the amount of metal hydroxide selected is from about 11 to about 14 weight percent; a process wherein the acid is a known acid like nitric, sulfuric, hydrochloric, acetic, citric, and the like; a process wherein the amount of acid selected is from about 4 to about 30 weight percent or from about 5 to about 15 weight percent; a process wherein the pH of the mixture resulting after the initial coalescence is reduced to from about 7.5 to about 5.5 and then to 4.5 to increase the rate of fusion or coalescence; a process wherein the latex contains a known polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid), and the like, and wherein the colorant is a pigment; a process wherein the colorant is carbon black, cyan, yellow, magenta, red, green, blue, violet, orange, or mixtures thereof; a process wherein the toner isolated is from about 2 to about 10 microns in volume average diameter, and the particle size distribution thereof is from about 1.15 to about 1.25; a process wherein the latex is prepared by a batch and or a semicontinuous polymerization resulting in submicron resin particles suspended in an aqueous phase containing an ionic surfactant; a process where the wax is completely retained in the toner; a process for the preparation of toner particles, which toner enables excellent print quality, high quality document appearance, and wide processing latitude, and wherein there is selected a latex preferably comprised of submicron resin particles, which are in the size range of about 0.05 to about 0.5 micron, or in the size range of about 0.07 to about 0.35 micron suspended in an aqueous water phase and an ionic surfactant selected in an amount of about 0.5 to about 5 percent, or about 0.7 to about 2 percent by weight of solids, to which is added a colorant dispersion comprising submicron, for example less than, or equal to about 0.5 micron, colorant particles, anionic surfactant which is selected in an amount of about 0.5 to about 10 percent, and more specifically, from about 0.6 to about 5 percent by weight of solids, which when blended together result in a mixture with a pH of about 2 to about 2.6 to which a cationic wax dispersion is added slowly over, for example, a period of about 2 to about 5 minutes, followed by optionally adding a cationic surfactant such as, for example, SANIZOL® B over a period of about 1 to about 3 minutes, further aggregating by stirring and heating from about 5° C. to about 10° C. below the resin Tg, resulting in toner aggregates of a size of about 3 to about 15 microns or about 4 to about 8 microns with a narrow GSD of, for example, about 1.14 to about 1.28 or about 1.17 to about 1.25, and which GSD enables the clean transfer of toner particles thereby providing enhanced resolution of the resulting developed fused images, followed by adjusting the pH of the mixture from about 2 to about 2.6 to a pH of about 6 to about 9 or about 7 to about 8.5, and preferably to a pH of about 8 with the addition of a dilute base solution of, for example, a 4 weight percent of sodium hydroxide, further stirring and increasing the mixture temperature above the resin Tg of about 70° C. to about 95° C., or about 85° C. to about 93° C. for a period of about 0.5 to about 1.5 hours, followed by changing the pH from about 8 to about 3.8 by the addition of an acid, such as dilute nitric acid, and heating the mixture for an additional about 0.5 to about 4 hours or from about 0.6 to about 3 hours, to fuse or coalesce the aggregates, and then washing and drying the toner; a process wherein washing the toner particles containing the toner slurry at a pH of 11 is followed by filtration and reslurrying of the filter cake comprised of toner particles in deionized water, followed by another deionized water wash and a single wash with only water at a pH of 4 where the pH of the slurry is adjusted with an acid; and processes for the preparation of toner compositions which comprise blending an aqueous colorant dispersion containing a pigment, such as carbon black, phthalocyanine, quinacridone or RHODAMINE B™ type, red, green, orange, brown, violet, yellow, fluorescent colorants and the like with a latex emulsion derived from the emulsion polymerization of monomers selected, for example, from the group consisting of styrene, butadiene, acrylates, methacrylates, acrylonitrile, acrylic acid, methacrylic acid, itaconic or beta carboxy ethyl acrylate (BCEA) and the like, and which latex contains an anionic surfactant, such as sodium dodecylbenzene sulfonate, and which process is accomplished in the presence of cationic wax dispersed in cationic surfactant SANIZOL® B heating the resulting flocculent mixture at a temperature below the latex (i) resin Tg for an effective length of time of, for example, about 0.5 hour to about 3 hours to form toner sized aggregates; and optionally adding a known amount of a second or delayed latex wherein this latex can be the same in composition as the initial latex (i) or dissimilar, followed by adjusting the pH of the mixture to from about 2 to about 8 with a dilute base solution of sodium hydroxide, and subsequently heating the aggregate suspension at a temperature above 95° C. for a period of about 0.5 to about 1 hour, adjusting the pH of the mixture from about 8 to about 4.5 with a dilute acid to provide toner particles, isolating the toner product by, for example, filtration, washing and drying in an oven, fluid bed dryer, freeze dryer, or spray dryer; a process for the preparation of toner comprising mixing a colorant, a latex, and a dual coagulant of a cationic wax dispersion and a cationic surfactant, and which coagulants primarily assist in permitting aggregation and coalescence of the colorant, and the latex resin.

The particle size of the toner provided by the processes of the present invention in embodiments can be controlled, for example, by the heating temperature. In general, the lower the aggregation temperature, the smaller the aggregate size, and thus the final toner size. For a latex polymer with a glass transition temperature (Tg) of about 55° C. and a reaction mixture with a solids content of about 14 percent by weight, an aggregate size of about 7 microns in volume average diameter is obtained at an aggregation temperature of about 53° C.; the same latex will provide an aggregate size of about 5 microns at a temperature of about 48° C. under similar conditions. For a latex polymer with a glass transition temperature (Tg) of about 51° C. and a reaction mixture with a solids content of about 14 percent by weight, an aggregate size of about 7 microns in volume average diameter is obtained at an aggregation temperature of about 50° C.; the same latex will provide an aggregate size of about 5 microns at a temperature of about 45° C. under similar conditions.

Illustrative examples of specific latex resin, polymer or polymers selected for the process of the present invention include known polymers such as poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and the like. The latex polymer, or resin is generally present in the toner composition of the present invention in various suitable amounts, such as from about 75 weight percent to about 98, or from about 80 to about 95 weight percent of the toner or of the solids, and the latex resin size suitable for the processes of the present invention can be, for example, preferably from about 0.05 micron to about 0.5 micron in volume average diameter as measured by the Brookhaven nanosize particle analyzer. Other sizes and effective amounts of latex polymer may be selected in embodiments of the present invention. The total of all toner components, such as resin and colorant, is about 100 percent, or about 100 parts.

The polymer selected for the process of the present invention can be prepared by emulsion polymerization methods, and the monomers utilized in such processes include, for example, styrene, acrylates, methacrylates, butadiene, isoprene, acrylic acid, methacrylic acid, itaconic acid, beta carboxy ethyl acrylate, acrylonitrile, and the like.

Known chain transfer agents, for example dodecanethiol, in amounts of from, for example, about 0.1 to about 10 percent, or carbon tetrabromide in effective amounts, such as for example from about 0.1 to about 10 percent, can also be utilized to control the molecular weight properties of the polymer when emulsion polymerization is selected. Other processes for obtaining polymer particles of from, for example, about 0.01 micron to about 7 microns can be selected from polymer microsuspension process, such as disclosed in U.S. Pat. No. 3,674,736, the disclosure of which is totally incorporated herein by reference; polymer solution microsuspension process, such as disclosed in U.S. Pat. No. 5,290,654, the disclosure of which is totally incorporated herein by reference, mechanical grinding processes, or other known processes. Also, known reactant initiators, chain transfer agents, and the like as disclosed, for example, in U.S. Ser. No. 922,437, filed Sep. 2, 1997 (abandoned) can be selected for the processes of the present invention. Examples of water soluble initiators include, ammonium sodium, and potassium persulfates in suitable amounts, from about 0.1 to about 8 percent by weight of monomer, and more specifically, in the range of from about 0.2 to about 5 percent by weight of monomer. Examples of chain transfer agents include dodecanethiol, dodecylmercaptan, octanethiol, carbon tetrabromide, carbon tetrachloride, and the like in various suitable amounts, and are selected in the range amount of from about 0.1 to about 10 percent by weight of monomer, and more specifically, in the range of from about 0.2 to about 5 percent by weight of monomer.

Examples of waxes that can be selected for the processes illustrated herein include known waxes, such as those of some of the copending applications recited herein, and more specifically, polypropylenes and polyethylenes commercially available from Allied Chemical and Petrolite Corporation, wax emulsions available from Michaelman Inc. and the Daniels Products Company, EPOLENE® N-15 commercially available from Eastman Chemical Products, Inc., VISCOL® 550-P, a low weight average molecular weight polypropylene available from Sanyo Kasei K.K., and similar materials. The commercially available polyethylenes selected usually possess a molecular weight $M_w$ of from about 1,000 to about 3,000, while the commercially available polypropylenes utilized for the toner compositions of the present invention are believed to have a molecular weight of from about 4,000 to about 5,000. Examples of functionalized waxes include amines, amides, imides, esters, quaternary amines, carboxylic acids or acrylic polymer emulsion, for example JONCRYL® 74, 89, 130, 537, and 538, all available from SC Johnson Wax, chlorinated polypropylenes and polyethylenes commercially available from Allied Chemical and Petrolite Corporation and SC Johnson Wax.

Various known colorants, such as pigments, selected for the processes of the present invention and present in the toner in an effective amount of, for example, from about 1 to about 25 percent by weight of toner, and preferably in an amount of from about 3 to about 10 percent by weight, that can be selected include, for example, carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours and Company, and the like. Generally, colored pigments that can be selected are cyan, magenta, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, Yellow 180 and Permanent Yellow FGL, wherein the colorant is present, for example, in the amount of about 3 to about 15 weight percent of the toner. Organic dye examples include known suitable dyes, reference the Color Index, and a number of U.S. patents. Organic soluble dye examples, preferably of a high purity for the purpose of color gamut, are Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example, of from about 0.5 to about 20 percent by weight, and more specifically, from about 5 to about 20 weight percent of the toner. Colorants include pigment, dye, mixtures of pigment and dyes, mixtures of pigments, mixtures of dyes, and the like.

Examples of initiators for the preparation of both the initial latex of (i) and a second delayed latex wherein the delayed latex refers, for example, to latex which is added to the already preformed aggregates in the size range of, for example, about 2 to about 20, and more specifically, from about 4 to about 7 µm, include water soluble initiators, such as ammonium and potassium persulfates in suitable amounts, such as from about 0.1 to about 8 percent, and more specifically, in the range of from about 0.2 to about 5 percent (weight percent). Examples of chain transfer agents include dodecanethiol, octanethiol, carbon tetrabromide and the like in various suitable amounts, such as from about 0.1 to about 10 percent, and more specifically, in the range of from about 0.2 to about 5 percent by weight of monomer.

Surfactants for the preparation of latexes and colorant dispersions can be ionic or nonionic surfactants selected in effective amounts of, for example, from about 0.01 to about 15, or from about 0.01 to about 5 weight percent of the reaction mixture. Anionic surfactants include sodium dodecylsulfate (SDS), sodium dodecylbenzene sulfonate, sodium dodecylnaphthalene sulfate, dialkyl benzenealkyl, sulfates and sulfonates, abitic acid available from Aldrich, NEOGEN R™, NEOGEN SC™ obtained from Kao, and the like.

Examples of nonionic surfactants for the colorant dispersion selected in various suitable amounts, such as about 0.1 to about 5 weight percent, are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™and ANTAROX 897™.

Examples of cationic surfactants selected include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride) available from Kao Chemicals, and the like, and mixtures thereof. A suitable amount of surfactant can be selected, such as from about 0.2 to about 5 percent by weight of the toner components. The cationic surfactant selected for the wax dispersion and the second surfactant can be the same or different.

The toner may also include known charge additives in effective suitable amounts of, for example, from about 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, negative charge enhancing additives like aluminum complexes, other known charge additives, and the like.

Surface additives that can be added to the toner compositions after washing or drying include, for example, metal salts, metal salts of fatty acids, colloidal silicas, metal oxides, strontium titanates, mixtures thereof, and the like, which additives are each usually present in an amount of from about 0.1 to about 2 weight percent, reference for example U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa. The coated silicas of U.S. Pat. No. 6,190,815 and U.S. Pat. No. 6,004,714, the disclosures of which are totally incorporated herein by reference, can also be selected in amounts, for example, of from about 0.1 to about 2 percent, which additives can be added during the aggregation or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration. The carrier particles can also be comprised of a core with a polymer coating thereover, such as polymethylmethacrylate (PMMA), having dispersed therein a conductive component like conductive carbon black. Carrier coatings include silicone resins, fluoropolymers, mixtures of resins not in close proximity in the triboelectric series, thermosetting resins, and other known components.

Imaging methods are also envisioned with the toners of the present invention, reference for example a number of the patents mentioned herein, and U.S. Pat. Nos. 4,265,990; 4,858,884; 4,584,253 and 4,563,408, the disclosures of which are totally incorporated herein by reference.

The following Examples and Comparative Examples are provided.

Latex Preparation (A)

A latex emulsion (i) comprised of polymer particles generated from the emulsion polymerization of styrene, butyl acrylate and beta carboxy ethyl acrylate (Beta CEA) was prepared as follows. A surfactant solution of 434 grams of DOWFAX 2A1™ (anionic emulsifier) and 387 kilograms of deionized water was prepared by mixing these components for 10 minutes in a stainless steel holding tank. The holding tank was then purged with nitrogen for 5 minutes before transferring the mixture into a reactor. The reactor was then continuously purged with nitrogen while being stirred at 100 RPM. The reactor was then heated to 80° C.

Separately, 6.11 kilograms of ammonium persulfate initiator were dissolved in 30.2 kilograms of deionized water. Also, separately a monomer emulsion A was prepared in the following manner. 315.7 Kilograms of styrene, 91.66 kilograms of butyl acrylate, 12.21 kilograms of β-CEA, 7.13 kilograms of 1-dodecanethiol, 1.42 kilograms of decanediol diacrylate (ADOD), 8.24 kilograms of DOWFAX™ (anionic surfactant), and 193 kilograms of deionized water were mixed to form an emulsion. Five percent of the above emulsion was then slowly fed into the reactor containing the aqueous surfactant phase at 80° C. to form the seeds wherein the "seeds" refer, for example, to the initial emulsion latex added to the reactor, prior to the addition of the initiator solution, while being purged with nitrogen. The above initiator solution was then slowly charged into the reactor forming about 5 to about 12 nanometers of latex "seed" particles. After 10 minutes, the remainder of the emulsion was continuously fed in using metering pumps.

Once all of the above monomer emulsion was charged into the main reactor, the temperature was maintained at 80° C. for an additional 2 hours to complete the reaction. The reactor contents were then cooled down to about 25° C. The resulting isolated product was comprised of 41 weight percent of submicron, 0.2 micron in volume average diameter, resin particles of styrene/butylacrylate/βCEA suspended in an aqueous phase containing 59 percent water. The molecular properties resulting for the resin of the latex throughout were $M_w$ of 35,400, $M_n$ of 11,300, as measured by a Gel Permeation Chromatograph, and a midpoint Tg of 55.8° C., as measured by a Differential Scanning Calorimeter, where the midpoint Tg is the halfway point between the onset and the offset Tg of the polymer.

Cationic Wax Dispersion (B)

About 768 grams of POLYWAX® 725 polyethylene wax having a $M_w$ of 783, $M_n$ of 725 and a melting point of 104° C. available from Baker Petrolite and about 19 grams of SANISOL® B-50 cationic surfactant purchased from Kao, Japan, comprising primarily alkyl dimethyl benzyl ammonium chloride were added to about 3,012 grams of deionized water in a 1 gallon reactor and stirred at about 400 revolutions per minute. The reactor mixture was heated to about 130° C. to melt the wax. The aqueous mixture containing the molten wax was then pumped through a Gaulin 15MR piston homogenizer at about 1 liter per minute for a period of about 30 minutes with the primary homogenizing valve full open and the secondary homogenizing partially closed such that the homogenizing pressure was about 1,000 pounds per square inch. Then the primary homogenizing valve was partially closed such that the homogenizing pressure increases to about 8,000 pounds per square inch. The reactor mixture was retained at about 130° C. and circulated through the homogenizer at about 1 liter per minute for about 60 minutes. Thereafter, the homogenizer disengaged and the reactor mixture was cooled to room temperature (22° C. to 25° C.) at about 15° C. per minute and discharged into a product container. The resulting aqueous wax emulsion was comprised of about 19 percent of wax, about 0.5 percent by weight of surfactant, and about 80.5 percent by weight of water and had a volume average diameter of about 244 nanometers as measured with a Honeywell MICROTRAC® UPA150 particle size analyzer.

Anionic Wax Dispersion (C)

About 1,180 grams of POLYWAX® 725 polyethylene wax having a $M_w$ of 783, $M_n$ of 725 and a melting point of 104° C. and purchased from Baker Petrolite, and about 29.5 grams of NEOGEN RK™ anionic surfactant comprising primarily branched sodium dodecyl benzenene sulfonate, available from Daiichi Kogyo Seiyaku Co. Ltd. (Japan), were added to about 2,590 grams of deionized water in a 1 gallon reactor and stirred at about 400 revolutions per minute. The reactor mixture was heated to about 130° C. in order to melt the wax. The aqueous mixture containing the molten wax was then pumped through a Gaulin 15MR piston homogenizer at about 1 liter per minute for a period of about 30 minutes with the primary homogenizing valve full open and the secondary homogenizing partially closed such that the homogenizing pressure was about 1,000 pounds per square inch. Then the primary homogenizing valve was partially closed such that the homogenizing pressure increases to about 8,000 pounds per square inch. The reactor mixture was retained at about 130° C. and circulated through the homogenizer at about 1 liter per minute for about 60 minutes. Thereafter, the homogenizer was disengaged and the reactor mixture was cooled to room temperature at about 15° C. per minute and discharged into a product container. The resulting aqueous wax emulsion was comprised of about 31 percent of wax, about 2.5 percent anionic surfactant by weight of solids (wax) by weight of surfactant and about 69 percent by weight of water, and has a volume average diameter of about 241 nanometers as measured with a Honeywell MICROTRAC® UPA150 particle size analyzer.

Anionic Cyan Pigment Dispersion (D)

The pigment dispersion obtained from Sun Chemicals was an aqueous dispersion containing 26.5 percent by weight of cyan pigment (PB 15:3), an anionic surfactant, 2 pph by weight of solids, and 73.5 percent of water.

Toner Fabrication

EXAMPLE I

Cyan Toner (9 Percent Cationic Wax, High Gloss):

251 Grams of the above Latex A were added to 500 grams of deionized water to which was then added the above aqueous anionic cyan pigment dispersion D comprising 34 grams of an aqueous anionic cyan pigment dispersion D having a solids loading of 26.5 percent, 73.5 percent of water and 2 pph of anionic surfactant by weight of solids. To this was added 76.5 grams of the cationic wax dispersion B having a solids loading of 19 percent while being homogenized. To this was added a second additional cationic surfactant solution comprising 1.3 grams of SANIZOL® B available from Kao Corporation and 15 grams of water. The resulting blend was then transferred to a reaction kettle and heated to 50° C. for a period of 30 minutes resulting in a particle size of 6.4 microns and a GSD of 1.22. 90 Grams of Latex A were then added to the reactor mixture and allowed to aggregate for an additional period of 40 minutes resulting in a particle size of 6.5 microns with a GSD of 1.22. The temperature of the reactor was raised to 50° C. to accelerate the collections of the fines. After 95 minutes, the particle size obtained was 6.9 microns with a GSD of 1.21. The pH of the mixture was then changed to 7 with 4 percent sodium hydroxide solution. The temperature of the reactor was then raised to 85° C. after a period of 1.5 hours. The particle size obtained was 7.1 microns with a GSD of 1.22. The pH of the mixture was reduced to 6 and finally to 5.5 with 1.25 percent of a nitric acid solution to enable coalescence of the particles. After a period of 3 hours, the morphology of the resulting toner particles was observed to be spherical under the optical microscope, and the measured (Coulter Counter) toner particle size was 7 microns with a GSD of 1.21. The reactor contents were allowed to further coalesce for an additional 1 hour. The reactor contents were then cooled down to room temperature, about 25° C. The resulting toner slurry pH was then further adjusted to 10 with a base solution of 5 percent of potassium hydroxide and stirred for 1 hour at room temperature, followed by filtration and reslurrying of the wet cake resulting in 1 liter of water, and then stirred for 1 hour. The above process was repeated followed by 1 wash at a pH of 4 (nitric acid). The filtrates were clear indicating no wax rejection. The final toner product, after drying in a freeze dryer, was comprised of 86 percent of the above resin, 5 percent of the above pigment, and 9 weight percent wax. The toner particle size was 7 microns in volume average diameter with a particle size distribution GSD of 1.21, both as measured on a Coulter Counter. The toner morphology was shown to be spherical in shape as determined by scanning electron microscopy. The dry toner was imaged on CX paper and fused on a free-belt nip fuser of a seamless belt, 1.5 inches in diameter, constrained between a heated roll assembly and a fixed structure with a narrow high pressure strip. The belt moved in synchronization with the heated fuser roll because of the friction between the belt and the roll in the high pressure zone. The gloss attained was 69.5 GGU, as measured using a Gardner Gloss Meter using a 75° angle at a toner mass per area (TMA) of 1.05, and at a temperature of 160° C. There were no release problems of the fused image from the fuser roll indicating full incorporation of the wax.

COMPARATIVE EXAMPLE 1

Cyan Toner, 9 Percent Anionically Stabilized P725 Wax, 1.44 pph of SANIZOL® B:

241 Grams of the above prepared Latex A and 52 grams of the anionic wax dispersion C having a solids loading of 31 percent, 69 percent of water and 2.5 pph of anionic surfactant NEOGEN™ RK by weight of solids, and 34 grams of aqueous anionic cyan pigment dispersion D, having a solids loading of 26.5 percent, 73.5 percent of water and 2 pph of anionic surfactant by weight of solids were simultaneously added to 630 grams of deionized water with high shear stirring by means of a polytron. To this mixture were added 5.2 grams of a cationic aggregant solution composed of 2.6 grams of alkyl benzyl ammonium chloride (SANIZOL® B), and 2.6 grams of distilled water. The addition of the coagulant was accomplished over a period of 3 minutes while being blended at a speed of 5,000 rpm for a period of 5 minutes. The resulting mixture was transferred to a 2 liter reaction vessel and heated at a temperature of 45° C. for 35 minutes resulting in aggregates of a size diameter (volume average) of 4.8 microns and a GSD of 1.22. To the resulting aggregates were added 136.8 grams of latex A followed by allowing the mixture to further aggregate for an additional 25 minutes resulting in particles with a size of 5.6 microns and a GSD of 1.20. The pH of the resulting mixture was then adjusted from 2 to 7.8 with an aqueous base solution of 4 percent sodium hydroxide and allowed to stir for an additional 15 minutes. Subsequently, the resulting mixture was heated to 95° C. and retained there for a period of 1 hour. The measured particle size was 5.5 microns with a GSD of 1.21. The pH was then reduced to 3.8 using a 2.5 percent nitric acid solution. The resultant mixture was allowed to coalesce for an additional 4 hours at a temperature of 95° C. The morphology of the toner particles was observed to be spherical under the optical microscope, and the measured (Coulter Counter) toner particle size was 5.6 with a GSD of 1.22. The reactor contents were then cooled down to room temperature, about 25° C. The resulting toner slurry pH was then further adjusted to 10 with a base solution of 5 percent of potassium hydroxide and stirred for 1 hour at room temperature, followed by filtration and reslurrying of the wet cake resulting in 1 liter of water, and then stirred for 1 hour. The above process was repeated followed by one wash at a pH of 4 (nitric acid). The first two filtrates were cloudy and had particles suspended on the surface indicating undesirable wax rejection. By gravimetric measurements it was estimated that the rejection was about 70 percent compared to what was introduced in the formulation. The final toner product, after drying in a freeze dryer, was comprised of 86 percent of the above resin, 5 percent of the above pigment, and 9 weight percent of the above wax, and the toner particle size was 5.5 microns in volume average diameter with a particle size distribution GSD of 1.21, both as measured on a Coulter Counter. The toner morphology was shown to be spherical in shape as determined by scanning electron microscopy. The dry toner was imaged on CX paper and fused on a free-belt nip fuser of a seamless belt, 1.5 inches in diameter, constrained between a heated roll assembly and a fixed structure with a narrow high pressure strip. The belt moved in synchronization with the heated fuser roll because of the friction between the belt and the roll in the high pressure zone. The fused image evidenced release problems in that the images did not fully transfer or release from the fuser role indicating a lack of wax in the toner.

COMPARATIVE EXAMPLE 2

Cyan Toner, 9 Percent Anionically Stabilized P725 Wax, 0.74 pph of SANIZOL® B, 0.09 pph of PAC:

241 Grams of the above prepared Latex A and 52 grams of anionic wax dispersion C having a solids loading of 31 percent, and 34 grams of aqueous anionic cyan pigment dispersion D having a solids loading of 26.5 percent were simultaneously added to 630 grams of deionized water with high shear stirring by means of a polytron. To this mixture were added two coagulants of 1.32 grams of SANIZOL® B, and 1.32 grams of distilled water, and a second aggregant solution composed of 1.62 grams of polyaluminum chloride (PAC), and 14.58 grams of 0.02 M HNO$_3$. The addition of the two coagulants was accomplished over a period of 5' minutes while being blended at a speed of 5,000 rpm for a period of 5 minutes. The resulting mixture was transferred to a 2 liter reaction vessel and heated at a temperature of 45° C. for 35 minutes resulting in aggregates of a size diameter (volume average) of 4.8 microns and a GSD of 1.22. To the resulting aggregates were added 136.8 grams of Latex A followed by allowing the mixture to further aggregate for an additional 25 minutes resulting in particles with a size of 5.6 microns and a GSD of 1.20. The pH of the resulting mixture was then adjusted from 2 to 7.8 with an aqueous base solution of 4 percent sodium hydroxide and allowed to stir for an additional 15 minutes. Subsequently, the resulting mixture was heated to 95° C. and retained there for a period of 1 hour. The measured particle size was 5.5 microns with a GSD of 1.21. The particle size had not changed, however, the pH of the mixture was decreased to 6.4. The pH was then further reduced to 3.8 using a 2.5 percent nitric acid solution. The resultant mixture was allowed to coalesce for an additional 4 hours at a temperature of 95° C. The morphology of the toner particles was observed to be spherical with an optical microscope, and the measured (Coulter Counter) toner particle size was 5.5 with a GSD of 1.21. The reactor contents were then cooled down to room temperature, about 25° C. The resulting toner slurry pH was then further adjusted to 10 with a base solution of 5 percent of potassium hydroxide and stirred for 1 hour at room temperature, followed by filtration and reslurrying of the wet cake resulting in 1 liter of water, and then stirred for 1 hour. The entire washing process above was repeated followed by 1 wash at a pH of 4 (nitric acid). The filtrates were slightly cloudy indicating wax rejection. The wax rejection as measured by gravimetric method was determined to be about 35 percent compared to the input formulation. The final toner product, after drying in a freeze dryer, was comprised of 86 percent of the above resin, 5 percent of the above pigment, and 9 weight percent of the above wax, and the toner particle size was 5.5 microns in volume average diameter with a particle size distribution GSD of 1.21, both as measured on a Coulter Counter. The toner morphology was shown to be spherical in shape as determined by scanning electron microscopy. The toner was fused in a similar manner as that indicated in Example I. The fused images were not fully released, that is the image did not fully (15 to 20 percent not released) release or transfer.

COMPARATIVE EXAMPLE 3

Cyan Toner, 9 Percent Anionically Stabilized P725 Wax, 0.18 pph of PAC (Low Gloss):

241 Grams of the above prepared Latex A and 52 grams of anionic wax dispersion C having a solids loading of 31 percent, and 34 grams of aqueous anionic cyan pigment dispersion D, having a solids loading of 26.5 percent were simultaneously added to 630 grams of deionized water with high shear stirring by means of a polytron. To this mixture were added 32.4 grams of an aggregant solution composed of 3.24 grams of PAC, and 29.16 grams of 0.02 M HNO$_3$. The addition of the coagulant was accomplished over a period of 3 minutes while being blended at a speed of 5,000 rpm for a period of 5 minutes. The resulting mixture was transferred to a 2 liter reaction vessel and heated at a temperature of 45° C. for 35 minutes resulting in aggregates of a size diameter (volume average) of 4.8 microns and a GSD of 1.22. To the resulting aggregates were added 136.8 grams of Latex A followed by allowing the mixture to further aggregate for an additional 25 minutes resulting in a particle with a size of 5.6 microns and a GSD of 1.20. The pH of the resulting mixture was then adjusted from 2 to 7.8 with an aqueous base solution of 4 percent sodium hydroxide and allowed to stir for an additional 15 minutes. Subsequently, the resulting mixture was heated to 95° C. and retained there for a period of 1 hour. The measured particle size was 5.5 microns with a GSD of 1.21. The particle size had not changed, however, the pH of the mixture had fallen to 6.4. The pH was then further reduced to 3.8 using a 2.5 percent nitric acid solution. The resultant mixture was allowed to coalesce for an additional 4 hours at a temperature of 95° C. The morphology of the toner particles was observed to be spherical under the optical microscope, and the measured (Coulter Counter) toner particle size was 5.5 with a GSD of 1.21. The reactor contents were then cooled down to room temperature, about 25° C. The resulting toner slurry pH was then further adjusted to 10 with a base solution of 5 percent of potassium hydroxide and stirred for 1 hour at room temperature, followed by filtration and reslurrying of the wet cake resulting in 1 liter of water, and then stirred for 1 hour. The above washing process was repeated followed by 1 wash at a pH of 4 (nitric acid). The filtrate in this case was all clear indication full (100 percent) incorporation of the wax. The final toner product, after drying in a freeze dryer, was comprised of 86 percent of the above resin, 5 percent of the above pigment, and 9 weight percent of the above wax, and the toner particle size was 5.5 microns in volume average diameter with a particle size distribution GSD of 1.21, both as measured on a Coulter Counter. The toner morphology was shown to be spherical in shape as determined by scanning electron microscopy. The toner was fused in a similar manner as that stated in Example I. The gloss of this toner was reduced to 35 GGU at a 1.05 toner mass per area (TMA) at a temperature of 160° C. The MFT of the toner was 151° C.

COMPARATIVE EXAMPLE 4

5 Percent Cyan, 9 Percent Anionically Stabilized PW725 Wax—0.18 pph of PAC, 1 pph of Sodium Silicate Sequestering Agent Used (High Gloss):

207 Grams of the above Latex A and 43.9 grams of anionic wax dispersion C having a solids loading of 30.30 weight percent were added to 455 grams of deionized water in a vessel and stirred by means of a polytron. Thereafter, 43.5 grams of the anionic cyan pigment dispersion D having a solids loading of 17 weight percent, followed by the addition of 27 grams of a flocculent mixture containing 2.7 grams of a polyaluminum chloride mixture and 24.3 grams of 0.02 molar nitric acid solution. Thereafter, the mixture was heated at 1° C. per minute to a temperature of 49° C. and held there for a period of about 1.5 to about 2 hours resulting in a volume average particle diameter of 5 microns as measured with a Coulter Counter. During heat up period, the stirrer was operated at about 250 rpm and 10 minutes after the set temperature of 49° C. was reached, the stirrer speed was reduced to about 220 rpm. An additional 103.9 grams of Latex A were added to the reactor mixture and allowed to aggregate for an additional period of about 30 minutes at 49° C. resulting in a volume average particle diameter of about 5.7 microns. At this time, 6.7 grams of sodium silicate solution SOLON AL™ purchased from Eastern Color & Chemical Company having a solids loading of 27 percent was added to the reactor mixture. As a result, the pH was increased to 4, and where the sodium silicate functioned as an aluminum-sequestering agent. A basic solution of 4 percent NaOH in distilled water was then added to the toner mixture to increase the pH to 7, which froze the particle size. Thereafter, the reactor mixture was heated at 1° C. per minute to a temperature of 95° C., followed by adjusting the reactor mixture pH to 6 with 0.3 M nitric acid solution. Following this, the reactor mixture was gently stirred at 95° C. for 5 hours to enable the particles to coalesce and spheroidize. The reactor heater was then turned off and the reactor mixture was allowed to cool to room temperature at a rate of 1° C. per minute. The resulting toner mixture comprised of about 16.7 percent of toner, 0.25 percent of anionic surfactant and about 82.9 percent by weight of water. The toner of this mixture comprised 86 percent of styrene/acrylate polymer, 5 percent of PB15:3 cyan pigment, 9 percent by weight of PW725 wax, and had a volume average particle diameter of about 5.8 microns and a GSD of about 1.19. The toner was washed in a similar manner as indicated in Example I. The filtrates of the washes were all clear indicating full incorporation of the wax. The toner morphology was shown to be spherical in shape as determined by scanning electron microscopy. The toner was fused in a similar manner as that reported in Example I. The gloss attained was 73.2 GGU at a temperature of 160° C., as measured using a Gardner Gloss Meter using a 75° angle. The toner minimum fixing temperature (MFT) was 126° C.

The claims, as originally presented and as they may be amended, encompass variations, alternatives, modifications, improvements, equivalents, and substantial equivalents of the embodiments and teachings disclosed herein; including those that are presently unforeseen or unappreciated, and that, for example, may arise from applicants/patentees and others.

What is claimed is:

1. A process comprising mixing a colorant, a latex emulsion, a coagulant comprised of a cationic wax dispersion and a cationic surfactant, and wherein said colorant is a colorant dispersion comprised of (i) a colorant, water, and an ionic surfactant, or a nonionic surfactant, and wherein said latex is an emulsion comprised of an ionic surfactant, water and resin;

(ii) wherein the colorant dispersion is blended with the latex emulsion;

(iii) adding to the resulting blend a coagulant comprised of said cationic wax comprised of a dispersion of submicron wax particles of a size of from about 0.1 to about 0.5 micron in diameter by volume, which wax is dispersed in said cationic surfactant with an opposite charge polarity than that of said latex ionic surfactant to thereby primarily initiate flocculation or aggregation of the resin latex and the colorant;

(iv) heating the resulting mixture below about the glass transition temperature (Tg) of the latex resin to form toner sized aggregates;

(v) optionally adding to the formed toner aggregates a second latex comprised of resin suspended in an aqueous phase containing an ionic surfactant and water;

(vi) adding to the resulting mixture a base to thereby change the pH which is from about 2 to about 2.9 to arrive at a pH of from about 5 to about 8 for the resulting aggregate mixture;

(vii) heating the resulting aggregate suspension of (vi) above about to the Tg of the latex resin of (i);

(viii) optionally retaining the mixture temperature at from about 70° C. to about 95° C. optionally for a period of about 10 to about 60 minutes, followed by a pH reduction with an acid to arrive at a pH of about 3.5 to about 5 to assist in permitting the fusion or coalescence of the aggregates; and (ix) isolating the product wherein said product is a toner.

2. A process in accordance with claim 1 wherein said cationic wax is a colloidal dispersion comprised of submicron wax particles of from about 0.1 to about 0.5 micron in diameter by volume, which wax is dispersed in a cationic surfactant, and wherein said wax is substantially completely incorporated into said toner.

3. A process in accordance with claim 1 wherein said wax is incorporated in an amount of about 1 to about 15 percent by weight of toner, and the amount of cationic surfactant selected is from about 2 to about 0.2 percent by weight of the resulting toner thereby providing a toner exhibiting a glossy finish.

4. A process in accordance with claim 1 wherein the amount of cationic surfactant is from about 0.2 to about 3 weight percent by weight of toner product.

5. A process in accordance with claim 1 wherein the resulting product toner possesses a glossy image wherein said gloss is from about 35 to about 80 gardiner gloss units (GGU) optionally measured at a temperature of about 160° C.

6. A process in accordance with claim 1 and wherein the resulting product toner possesses a gloss of about 35 to about 80 GGU.

7. A process in accordance with claim 1 wherein the minimum fix temperature of the resulting product toner is from of about 125° C. to about 140° C.

8. A process in accordance with claim 1 wherein the cationic wax dispersion is completely, about 100 percent, retained in the resulting product toner.

9. A process in accordance with claim 1 wherein the latex emulsion containing resin particles of a diameter of from about 0.15 to about 0.3 micron in volume average diameter.

10. A process in accordance with claim 1 wherein the colorant is a pigment, a dye or mixtures thereof, and optionally which colorant is submicron in size of from about 0.08 to about 0.4 micron in average volume diameter.

11. A process in accordance with claim 1 wherein said base is selected from the group consisting of sodium hydroxide, potassium hydroxide, and ammonium hydroxide.

12. A process in accordance with claim 1 wherein there is added to the formed toner aggregates said second latex comprised of submicron resin particles suspended in an aqueous phase containing an anionic surfactant, and wherein said second latex is selected in an amount of from about 10 to about 40 percent by weight of the initial latex to optionally form a shell thereover on said formed aggregates, and which shell is of a thickness of from about 0.2 to about 0.8 micron.

13. A process in accordance with claim 12 wherein the added latex contains the same resin as the initial latex of (i), or wherein said added latex contains a dissimilar resin than that of the initial latex.

14. A process in accordance with claim 1 wherein the pH of the mixture resulting in (vi) is increased from about 2 to about 2.6 to about 6 to about 8, and wherein said base functions primarily as a stabilizer for the aggregates during coalescence (vii).

15. A process in accordance with claim 1 wherein the temperature at which said aggregates are formed controls the size of the aggregates, and wherein the final toner size is from about 2 to about 25 microns in volume average diameter.

16. A process in accordance with claim 1 wherein the aggregation (iv) temperature is from about 45° C. to about 60° C., and wherein the coalescence or fusion temperature of (vii) is from about 85° C. to about 95° C.

17. A process in accordance with claim 1 wherein the colorant is a pigment, and wherein said pigment is in the form of dispersion, and which dispersion contains an ionic surfactant and optionally a nonionic surfactant, and wherein said cationic wax dispersion and optionally the cationic surfactant function as a coagulant and assist in the enablement of aggregation of said latex and said colorant.

18. A process in accordance with claim 1 wherein the latex contains a resin or polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkylacrylate-acrylonitrile-acrylic acid), poly(styrene-1,3-diene-acrylonitrile-acrylic acid), and poly(alkyl acrylate-acrylonitrile-acrylic acid).

19. A process in accordance with claim 1 wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), paly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid).

20. A process in accordance with claim 1 wherein the colorant is carbon black, cyan, yellow, magenta, orange, green, violet or mixtures thereof; the product is a toner of from about 2 to about 20 microns in volume average diameter, and wherein there is added to the surface of the formed toner metal salts, metal salts of fatty acids, silicas, metal oxides, or mixtures thereof, each in an amount of from about 0.1 to about 10 weight percent of the obtained toner.

21. A process in accordance with claim 1 wherein said wax is a polyethylene or a polypropylene.

22. A process in accordance with claim 1 wherein said wax is comprised of a mixture of polypropylene and polyethylene.

23. A process in accordance with claim 1 further including toner additives optionally comprised of metal salts of fatty acids, metal oxides, or mixtures thereof, each in an amount of from about 0.5 to about 3 weight percent.

24. A process in accordance with claim 1 wherein said product is a toner comprised of colorant in an amount of from about 3 to about 15 weight percent, resin in an amount of from about 91 to about 73 weight percent, and wax in an amount of from about 6 to about 12 weight percent.

25. A process in accordance with claim 1 wherein said resin is present in an amount of about 25 to about 50 weight percent, and wherein said resin is suspended in water containing about 1 to about 4 pph by weight of water; said colorant is a dispersion comprised of pigment particles of about 15 to about 40 weight percent dispersed in water present in an amount of about 85 to about 60 weight percent and containing a surfactant of about 1 to about 5 pph by weight of water; said wax is a dispersion comprised of wax particles of about 15 to about 35 weight percent dispersed in water of about 85 to about 65 weight percent and said cationic surfactant is present in an amount of about 1 to about 5 pph by weight of water; wherein said waxes are polyethylene, polypropylene, a paraffin, a carnauba wax or a microcrystalline, each with an $M_w$ of about 650 to about 3,000.

* * * * *